(12) United States Patent
Huang et al.

(10) Patent No.: US 8,794,082 B2
(45) Date of Patent: Aug. 5, 2014

(54) MEMS TIME-OF-FLIGHT THERMAL MASS FLOW METER

(75) Inventors: Liji Huang, San Jose, CA (US);
Xiaozhong Wu, San Jose, CA (US);
Yahong Yao, San Jose, CA (US);
Chih-Chang Chen, Cupertino, CA (US)

(73) Assignee: Siargo Ltd., Santa Clara, CA (US)

( * ) Notice: Subject to any disclaimer, the term of this patent is extended or adjusted under 35 U.S.C. 154(b) by 390 days.

(21) Appl. No.: 13/035,639

(22) Filed: Feb. 25, 2011

(65) Prior Publication Data

US 2012/0216629 A1     Aug. 30, 2012

(51) Int. Cl.
*G01F 1/708*      (2006.01)
*G01F 1/68*       (2006.01)
*G01F 1/72*       (2006.01)

(52) U.S. Cl.
CPC ............... *G01F 1/7084* (2013.01); *G01F 1/72* (2013.01)
USPC .................................. 73/861.95; 73/204.26

(58) Field of Classification Search
USPC ....................................................... 73/861.95
See application file for complete search history.

(56) References Cited

U.S. PATENT DOCUMENTS

| 4,713,970 | A  | * | 12/1987 | Lambert ................... | 73/861.95 |
| 6,550,324 | B1 | * | 4/2003  | Mayer et al. .............. | 73/204.14 |
| 7,752,910 | B2 | * | 7/2010  | Wang et al. ............... | 73/204.26 |

* cited by examiner

*Primary Examiner* — Harshad R Patel (57) ABSTRACT

An apparatus comprising a micromachined (a.k.a. MEMS, Micro Electro Mechanical Systems) silicon flow sensor, a flow channel package, and a driving circuitry, which operates in a working principle of thermal time-of-flight (TOF) to measure gas or liquid flow speed, is disclosed in the present invention. The micromachining technique for fabricating this MEMS time-of-flight silicon thermal flow sensor can greatly reduce the sensor fabrication cost by batch production. This microfabrication process for silicon time-of-flight thermal flow sensors provides merits of small feature size, low power consumption, and high accuracy compared to conventional manufacturing methods. Thermal time-of-flight technology in principle can provide accurate flow speed measurements for gases regardless of its gas compositions. In addition, the present invention further discloses the package design and driving circuitry which is utilized by the correlated working principle.

8 Claims, 6 Drawing Sheets

MEMS TIME-OF-FLIGHT THERMAL MASS FLOW METER

BACKGROUND OF THE INVENTION

1. Field of the Invention

The present invention relates to an apparatus and a method for measuring gas or liquid flow rate according to the preambles of the independent claims. More particularly, the present invention discloses the design and manufacturing of comprising components of a thermal flow meter with a working principle based on time-of-flight methodology which can provide a flow speed measurement regardless the composition of flow media.

2. Description of the Related Art

Various gas or liquid flow meters with different working principles have been heretofore developed and commercially available on market. The gas and liquid flow meters are broadly deployed in various gas control and monitoring industries such as chemical, food process, beverage, medical, pharmaceutical, and utility gas applications. Among various technologies, however, most of the measuring technologies are very limited to the consistency of its flow media contents and composition.

The thermal flow sensing technologies can be classified into three categories in terms of the working principle: (a) anemometric, (b) calorimetric, and (c) time-of-fight (TOF). The first two methodologies measure the amount of heat that has been carried away by the flow media in a direct or indirect way. The amount of the heat that had been carried away is directly proportional to the flow speed as well as the mass of the fluid and hence these two methodologies provide the direct mass flow measurement. For thermal time-of-flight flow sensing technology, however, it measures the time span for heat wave that is carried away by the flow fluid to travel from upstream of heater position to the downstream sensing element position. The lower the flow speed is, the longer time it takes for the heat wave to travel which will benefit to develop a better signal process capability. This character is then entirely superior to the other two thermal flow sensing principles; therefore it suggests that time-of-flight would be more beneficial on low flow range measurement and can be combined with the other two technologies to increase the dynamic range of entire flow measurement. This combination would particular useful as the time-of-flight can provide a composition-independent measurement while the other two can provide the direct mass flow information. In addition, time-of-flight approach could be an ideal method for the applications where the fluidic composition varies during measurement, such as city natural gas metering and human respiratory machines.

Therewith, the current invention shall have properties in many aspects of differentiation include dynamic metrology capability, faster response, lengthy lifetime, easiness of integration and lower cost.

SUMMARY OF THE INVENTION

It is therefore an object of the present invention to provide an apparatus comprising of a MEMS thermal time-of-flight silicon flow sensor for measuring gas or liquid flow speed. This object will be approached by the independent claims.

For traditional time-of-flight sensor design, the heater and sensing element are made of two platinum metal wires in most cases. The wires are installed in the middle way of the flow path. During flow measurement, both heater and sensing element are having electric current passed through. Such a configuration is very vulnerable to humidity as the moisture could cause the change of the thermal conductivity of the medium leading to the variation of thermal response and substantial performance alteration. Particles with high flow speed could damage the wires and cause failure of operation. In recent years, time-of-flight sensors made by MEMS technology have been discussed. For the time-of-flight MEMS flow sensor design, both heater and sensing element are disposed on a heat-isolated membrane. The sensor can be installed with its surface in parallel with the flow direction in designated flow channel such that it would be less vulnerable to particle impact. Furthermore, the surface of the elements can be passivated with an electrically isolative but thermal conductive layer which makes the sensor withstands humidity better. Furthermore, the micromachined fabrication method can offer a very precise and consistent distance between the micro-heater and micro-sensing elements which can provide a higher accuracy for the flow measurement compared to conventional time-of-flight thermal sensor.

There are two approaches to excite the heater element and record the flight time of the fluid on the sensing element. The first methodology is to apply an electric pulse to the heater element and then the flow passing the heater element will carry out the heat wave to the downstream sensing element. This technique has the merit of a simpler circuitry, except the disadvantage is that for lower flow speed, the pulse signal detected by the sensing element could be very blurry. And its precise traveling time is hard to be determined; therefore the accuracy could be questionable. The second approach is to apply a single frequency sinusoidal electric signal to drive the heater element, and then the sinusoidal heat wave profile will be detected by the sensing element. The phase shift between the sensing element and the heater element is equivalent to the traveling time of the heat wave and is correlated to the flow speed of the fluid media. Since this approach is dealing solely with the phase shift element of the sinusoidal heat wave signal, the uncertainties on the amplitude of sinusoidal signal will not alter the results. Another advantage of the approach is that only a single frequency throughout the entire circuitry is utilized, therefore the demodulation technology similar to high-precision lock-in amplification technique can be employed to feature the characteristics of high immunization to noise. In addition, all issues that are plaguing DC excitation have been eliminated in this single frequency approach such as 1/f noise, DC drifts of electronics and line noise pick-up.

The current invention disclosed the design and fabrication of the MEMS thermal time-of-flight flow sensor chip as well as the electronic circuit scheme. In the present preferred embodiments, the silicon micromachined thermal fluid sensors based on the principles of thermal conduction are developed. The active elements of the flow sensors mainly comprise two serpentine-shape thermistors which are made of the same thin film materials. One of the thermistors is built as a heater element to provide the sinusoidal heat wave. The heater thermistor is excited by a single frequency sinusoidal voltage from the driving circuitry. Another one of the thermistors is built as a micro-sensing element which is to detect the traveling wave signal from micro-heating element. Both the micro-heating and micro-sensing elements are disposed on top of a micromachined suspending membrane to approach good heat insulation from silicon substrate. Various materials with high TCR (temperature coefficient of resistance) such as Pt, Au, MgO, and TaN could be candidates of thermistors materials. Because all the thermistors have a very small feature size, the power consumption is dramatically reduced to offer a battery operation capability for the flow meters operation, which could not be possibly achieved by conventional time-of-flight thermal flow sensor.

The heat dissipation or absorption rate of heater and sensing thermistors in a static fluid perceptibly depends on the fluid thermal properties which significantly rely on the fluid density, and fluid components, etc. In the present preferred embodiments, the heater and sensing thermistors both are standing on a thermally isolated thin film membrane. There are four open slots on the membrane along each side of thermistors which are used to block the lateral heat conduction on membrane between the heating and sensing elements. Both thermistors are encapsulated with a 0.3~0.5 micron thick dielectric film as passivation layer, which is also comprised as part of the suspending membrane. Compared to the conventional two-wire time-of-flight thermal sensor, the micromachined time-of-flight thermal sensor apparently provided a superior passivation technique to cope with the challenges from rush environments. Above the dielectric film, a thin layer of fluorocarbon coating is deposited onto the whole device to make the surface of device become hydrophobic and have low surface energy. The thin hydrophobic fluorocarbon coating will significantly prevent alien particles or debris or liquid materials to stick on device surface which could degrade device operation. The cavity underneath the suspending membrane is fabricated by anisotropic bulk etching of the silicon substrate.

In a normal operation situation, the micro-heating element is located on the upstream position of flow media while the micro-sensing element is disposed on the downstream position. In the current invention, the micro-heating and micro-sensing elements could be fabricated in an identical design with same materials. Therefore, with the flexibility from driving circuit, the meter in current invention can provide a bi-direction flow measurement capability as well.

BRIEF DESCRIPTIONS OF THE DRAWINGS

FIG. 2 (a) is the first embodiment with single heating and single sensing elements; FIG. 2 (b) is second embodiment with single heater and double sensing elements.

FIG. 5: The frequency spectrums of signals (a) excitation signal; (b) sensing signal

DETAILED DESCRIPTION OF THE PREFERRED EMBODIMENTS

Figure 1:
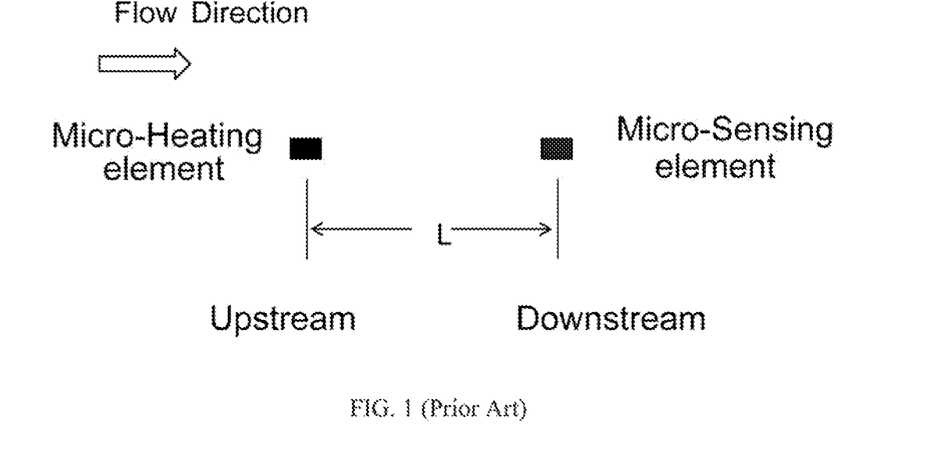
FIG. 1: Illustration of the basic operation principle of time-of-flight thermal flow sensor.

FIG. 1 illustrates the basic operation principle of thermal time-of-flight sensor. The micro-heating element is disposed at the upstream of flow media while the micro-sensing element is located at the downstream of flow media. If the distance between two elements is L and the traveling time of heat wave travel from heater to sensor is t, then the flow speed, V, will be solved easily as L/t.

Figure 2:
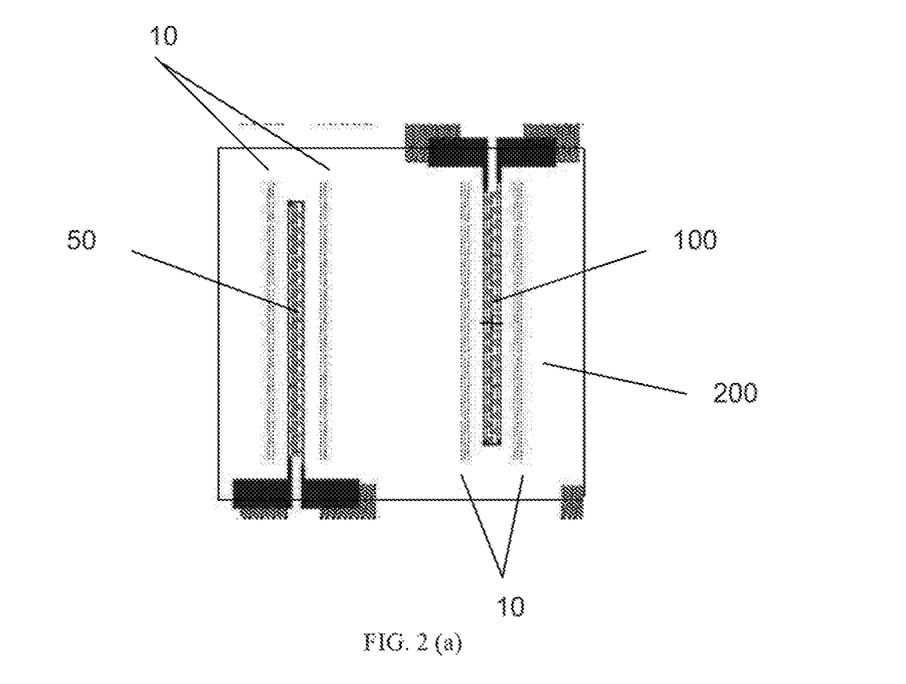
FIG. 2: Top view of the mask design of the time-of-flight MEMS sensor chip.

FIG. 2 (a) illustrates a top view of preferred sensor topology. A time of flight thermal sensor is mainly composed by one heater and one sensing element only. The serpentine shape thermistors 50 and 100 are the micro-heating and micro-sensing elements made of high temperature coefficient of resistance (TCR) materials such as Pt, Au, MgO, and TaN etc. Component 50 and 100 are disposed on top of a suspending membrane 200 which can provide a good thermal isolation property. There are two opens slots (components 10) on the membrane along each of thermistors which can block off the lateral heat conduction from micro-heating element to enhance the measurement accuracy. Unlike the conventional two wires type time-of-flight sensor, the distance between two micro elements can be very precisely defined and preserved; therefore the MEMS micro-fabricated thermal time-of-flight sensor is apparently superior to the conventional two wires time-of-flight thermal sensor in the aspects of measurement accuracy and long term reliability.

In another embodiment of the current invention shown in FIG. 2(b), three elements with different spaces in between have been designed on the membrane. Any two of the three elements can be configured as a time-of-flight sensor. If the center element is used as the heater and one of the rests is used as the sensing element, then the chip has the capability to detect the flow direction and performing bidirectional flow measurement.

Figure 3:
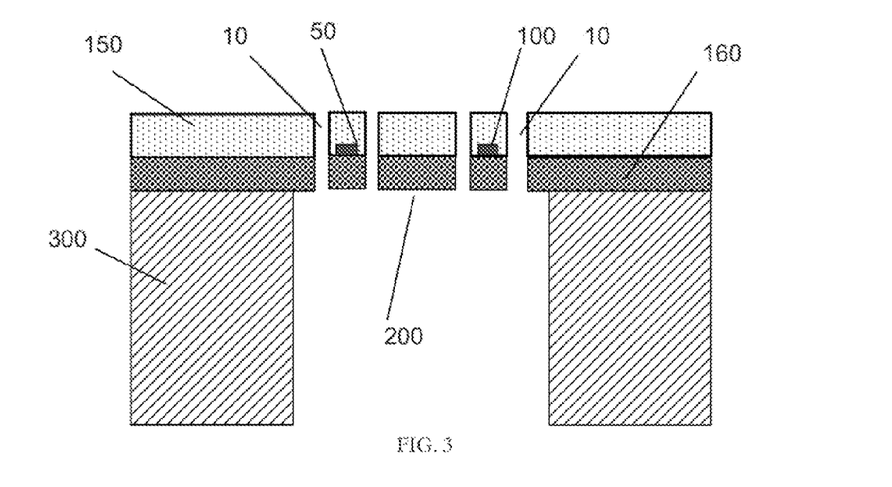
FIG. 3: The cross-sectional view of the time-of-flight MEMS sensor chip.

FIG. 3 depicts a side view for a pictorial illustration of the complete preferred sensor. The time-of-flight thermal sensors were fabricated with the silicon micromachining technology. The process started with a single crystal silicon wafer (300). The suspending silicon nitride membrane (200) was made by low pressure chemical vapor deposition. Subsequently the micro-heating and sensing elements (50,100) were deposited on top of the silicon nitride membrane (200). The elements were passivated with another layer of silicon nitride (150) by plasma enhanced chemical vapor deposition. The contact openings of bonding pads and the open slots (10) on membrane were etched by plasma etcher subsequently. In the last step, the bulk silicon was etched away from the wafer backside either by KOH or TMAH wet process or DRIE dry process which will leave the front layers to form the heat-isolated membrane structure (200).

Figure 4:
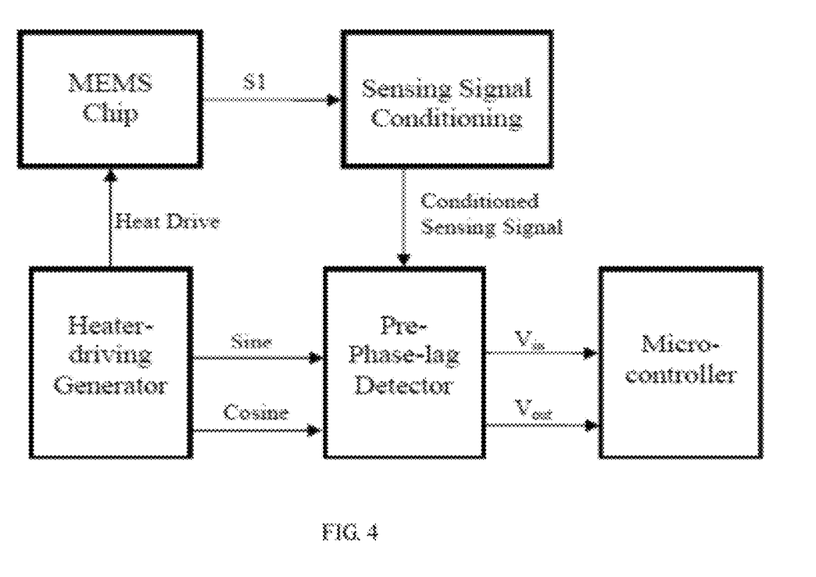
FIG. 4: The functionality block diagram of the time-of-flight driving circuit.

FIG. 4 is shown the circuit topology of the driving circuitry. The single frequency driving approach is applied in the circuit design due its outstanding performance advantages. The functionality circuitry contains four basic building blocks: (a) heater-driving generator; (b) sensing signal conditioning, (c) pre-phase-lag detector, and (d) micro-controller. The detailed description of every block is as the following.

(a) Heater-driving generator: This block is basically an oscillator generator. It generates a preferred sinusoidal signal at a constant frequency. It would be able to provide both sine and cosine signals for the phase-lag detector block. The circuit contains a subunit which can provide proper voltage amplitude to excite the heater as well.

(b) Sensing signal conditioning: It records the sensing signal and provides proper amplification.

(c) Pre-phase-lag detector: This block provides the capability of detecting the phase lag between the sensing signal and heater signal. This function can be accomplished by either software or hardware approaches. The former approach needs to acquire a large amount of data and powerful computing algorisms which will not be practical for a meter product. Therefore the phase-lag detection is performed by the hardware of electronic components in the current invention. The circuit utilized modulators to detect the in-phase and out-phase voltages over the heater driving signal.

(d) Micro-controller: It takes the inputs of in-phase and the out-phase voltages and calculates the phase-lag signal. Micro-controller is in charge of the meter-operation management work such as display and communication as well.

Figure 5:
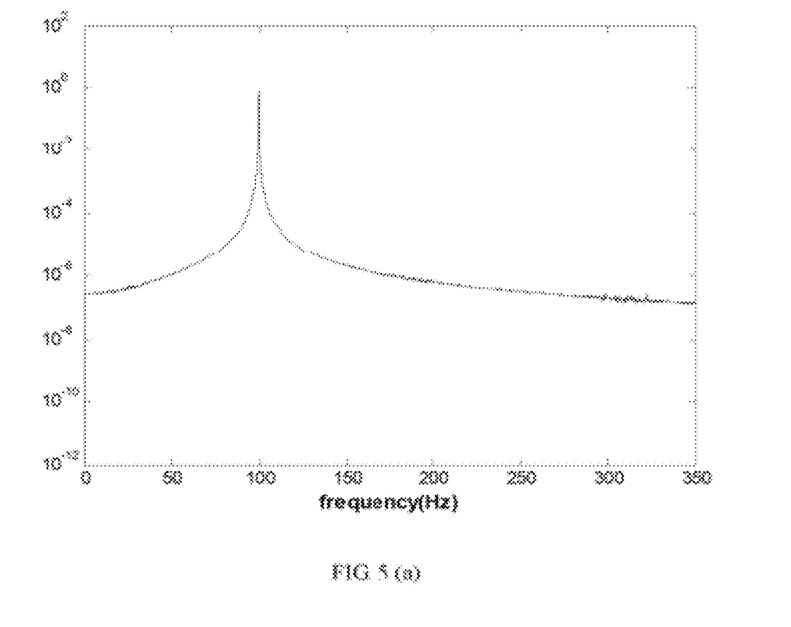

In the circuit described above, the heater-driving generator block is very critical to the performance because this generated sinusoidal AC signal will be used as a baseline in the whole circuit. Therefore it is necessary and essential for generating a pure single frequency sinusoidal wave to drive the micro-heating element. The sinusoidal heat wave will be further fed into the modulator as well to compare with the signal received from micro-sensing element. To evaluate the quality of the sinusoidal wave generated, its frequency spectrum is plotted in FIG. 5(a). The frequency spectrum of the induced micro-sensing element signal is also charted in FIG. 5(b). From the figure, it is shown the generated driving signal is a very pure single frequency wave at 100 Hz and the induced sensing signal has a very prominent peak at 100 Hz as well. The harmonic frequency of 200 Hz and 300 Hz on the driving signal with much lower amplitude is also appeared in the sensing signal spectrum. The city power frequency of 60 Hz and its harmonics also mixed into the sensing signal. The harmonics portion of the driving signal should be filtered out with a low pass filter before driving signal being applied into the pre-phase detector. The 60 Hz and its harmonics signals will be totally suppressed due to the deployment of a highly selective modulation technique that is similar to the well-known precision lock-in technology. The entire circuitry approach ensures a high immunization to the effects of noises and drift; therefore it lays a solid foundation for the excellent reproducibility and accuracy of flow measurement.

Figure 6:
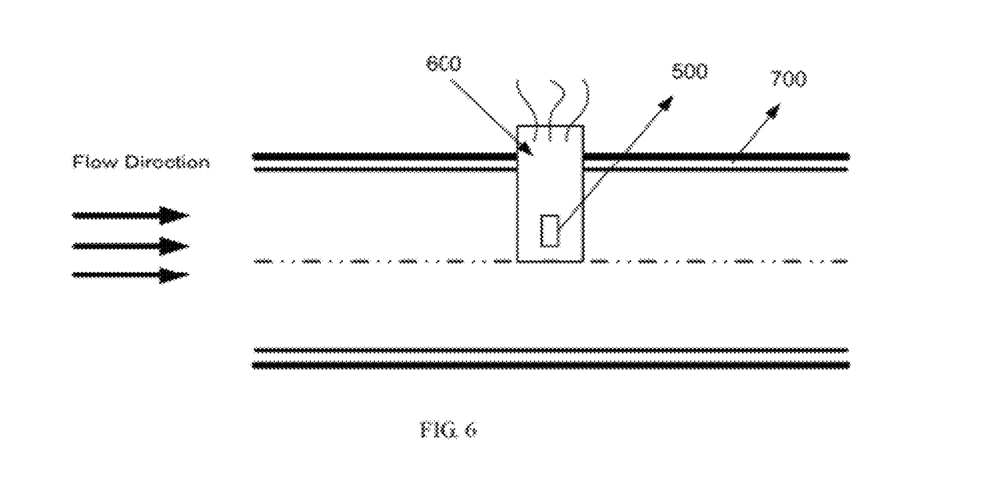
FIG. 6: Illustration of cross-section view of the insertion type sensor package that the assembled time-of-flight thermal sensor is located near the center line of flow passage.

The FIG. 6 is an illustration of cross-section view of the insertion type sensor package in current invention. The figure shows the assembled time-of-flight thermal sensor is displaced near to the center line of flow channel which can greatly enhance the measurement reproducibility and accuracy.

Figure 7:
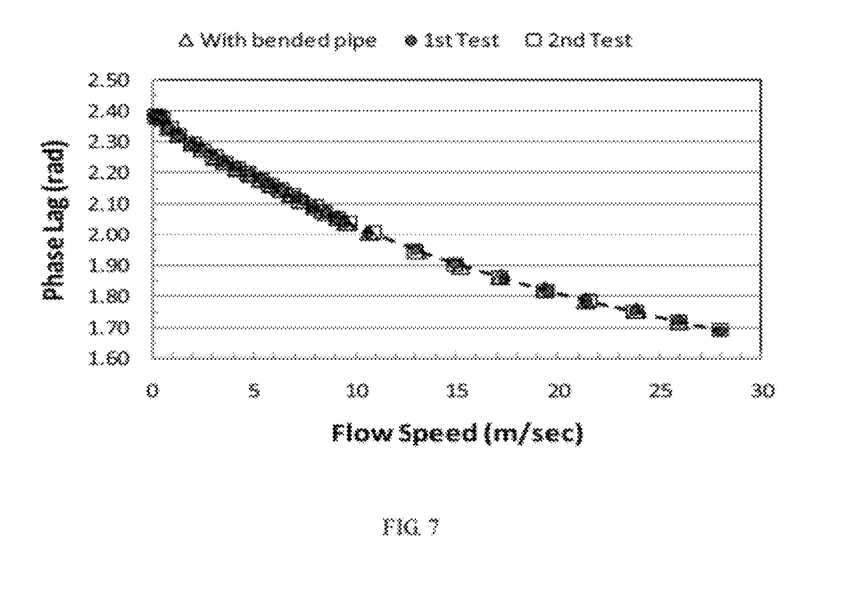
FIG. 7: Demonstrates the phase-shift signal versus air flow speed.

One of the excellent applications for the time-of-flight thermal flow sensing technology would be for the city gas custody transfer deployment. In the city gas applications, the dynamic range and reproducibility are two important properties. FIG. 7 shows the measured phase-lag data for the meter with the MEMS time-of-flight sensor in the flow speed of 0.15 to 30 m/sec dynamic range. During the tests, a laminar flow block with uncertainties of ±0.2% was used for reference of all data collection. The meter had a 1" venture flow channel and a flow conditioner at the flow entrance in the meter. For flow in a pipeline of 1" diameter, such flow speeds correspond to the flow rate of approximately 4.5 to 910 L/min. This nearly 200:1 of turndown and large flow capability would cover the most of applications in industrial utility custody transfer. The data shows that the phase-lag is inversely proportional to flow speed, i.e. when flow speed is raised up, the phase-lag between micro-sensing element and micro-heating element will be turned down accordingly because it takes less time for heat wave to travel from heater position to sensing element position. For reproducibility tests, the same measurements were performed more than 20 times to demonstrate the reproducibility. It can be observed from FIG. 7 that the differences among data points are hardly distinguished. The calculation from the data indicated that the maximum deviations (errors) among the 20 times measurements were within 0.1% at the full dynamic flow range. This characteristic is far superior than those technologies of calorimetric or anemometric approach where the reproducibility at low flow range would always be a problem and cause results of not being able to fulfill the requirements on custody transfer for full dynamic range such as city gas metering.

Figure 8:
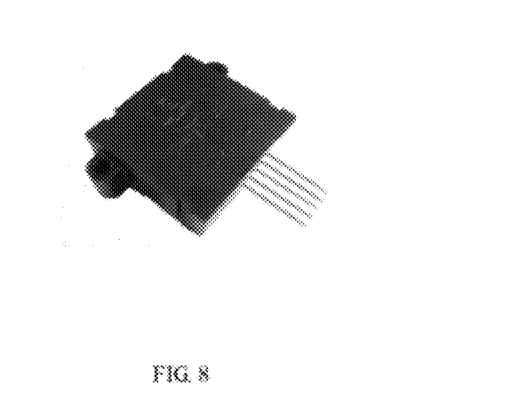
FIG. 8: A time-of-flight thermal flow sensor is assembled into a designed plastic packaged for liquid flow measurement.
Figure 9:
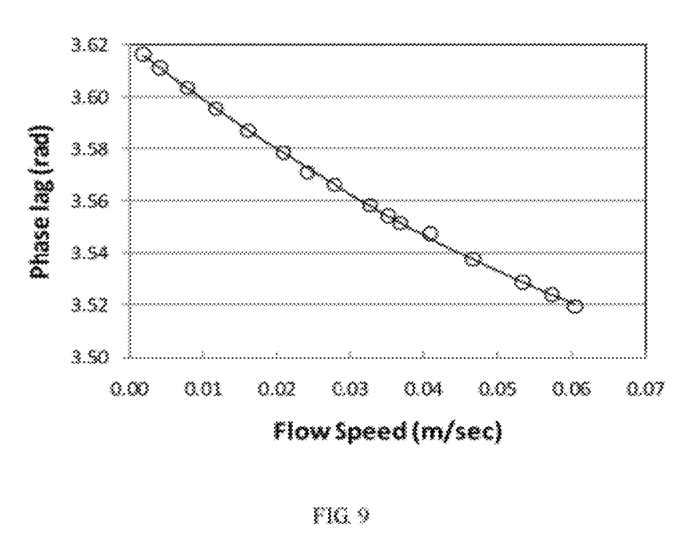
FIG. 9: Demonstrates the phase-shift signal versus liquid flow speed.

The excellent reproducibility in low flow speed measurement for the time-of-flight sensor was exceptional against the other technologies. The capability for liquid flow measurement at low flow range would be very desirable for current medical applications such as the dose control in homecare business. In the medical injection, a "self-service" by patient or caregiver will require more automation compared to those practices in hospital. Theoretically although the flow rate could be measured alternatively from the metrology of differential pressure measurement, however, when the flow speed is very slow as it is usually the case such as the injection, direct measurement of the fluid flow rate would be more advantageous and critical. The time-of-flight sensor was assembled into a plastic package as shown in FIG. 8. The flow channel cross-section inside the package was 1.0 mm×1.5 mm and the time-of-flight sensor was mounted and displaced at the sidewall of flow channel. Distilled water was applied to the meter with dynamic speed from 1.9 to 62 mm/sec corresponding to flow rate of 10 to 330 mL/hr. The charts shown in FIG. 9 indicated that the time-of-flight thermal flow sensor can be well-applied on such applications.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

We claim:

1. A MEMS time-of-flight thermal mass flow meter comprising:
   a micromachined time-of-flight (TOF) thermal mass flow sensor;
   an insertion type of flow channel package; and
   a single frequency drive functionality circuit;
   wherein,
   said micromachined time-of-flight thermal mass flow sensor has a suspending membrane to provide a heat insulated region for device operation;
   said micromachined time-of-flight thermal mass flow sensor has a first micro-thermistor in a serpentine pattern disposed on a top surface of said suspending membrane and functioning as a micro-heating element;
   said micromachined time-of-flight thermal mass flow sensor has a second micro-thermistor in a serpentine pattern disposed on said top surface of said suspending membrane, which is in parallel with and a definite distance from said micro-heating element and functioning as a micro-sensing element;
   said micromachined time-of-flight thermal mass flow sensor has four open slots on said suspending membrane, which are located in parallel on each side of said micro-heating element and said micro-sensing element to isolate lateral heat conduction for the purpose of enhancing measurement accuracy;

said single frequency drive functionality circuit contains four basic building circuitries including a heater-driving generator circuit; a sensing signal conditioning circuit; a pre-phase-lag detector circuit; and a micro-controller circuit;

said single frequency drive functionality circuit provides a sinusoidal heat wave with a certain frequency to elevate a temperature of micro-heating element; and said sinusoidal heat wave is carried away by a flowing media and causes a phase shift of said sinusoidal heat wave when said sinusoidal heat wave arrives on said micro-sensing element.

2. The MEMS time-of-flight thermal mass flow meter of claim 1 wherein, said single frequency drive functionality circuit is capable to measure an amplitude of said sinusoidal heat wave when said sinusoidal heat wave arrives on said micro-sensing element.

3. The MEMS time-of-flight thermal mass flow meter of claim 2 wherein, said amplitude of said sinusoidal heat wave is applicable to calibrate as a mass flow measurement while said phase shift of said sinusoidal heat wave is applied to calibrate as a volume flow measurement of said time-of-flight.

4. The MEMS time-of-flight thermal mass flow meter of claim 1 wherein, said micromachined time-of-flight thermal mass flow sensor is mounted and located in the center of said insertion type of flow channel package which can greatly enhance measurement accuracy.

5. The MEMS time-of-flight thermal mass flow meter of claim 1 wherein, the micromachined time-of-flight thermal mass flow sensor further comprising:

a third micro-thermistor disposed on the top surface of the suspending membrane in parallel with the first and second micro-thermistors, and functioning as a micro-sensing element.

6. The MEMS time-of-flight thermal mass flow meter of claim 5 wherein, the first micro-thermistor functioning as a micro-heating element is disposed between the second and third micro-thermistors functioning as micro-sensing elements.

7. The MEMS time-of-flight thermal mass flow meter of claim 5 wherein, said second and third micro-sensing elements are disposed in an upstream and downstream position of the micro-heating element to detect flow direction either from an upstream or downstream of said micro-heating element and therefore provide a bi-directional flow measurement capability.

8. The MEMS time-of-flight thermal mass flow meter of claim 5 wherein, the micromachined time-of-flight thermal mass flow sensor provides different measuring dynamic ranges by assigning different micro-thermistors as the micro-heating element and the micro-sensing element among the first, second and third micro-thermistors.

* * * * *